United States Patent
Koc et al.

(10) Patent No.: US 11,218,089 B2
(45) Date of Patent: Jan. 4, 2022

(54) ROTARY MOTOR WITH ULTRASONIC ACTUATOR

(71) Applicant: PHYSIK INSTRUMENTE (PI) GMBH & CO. KG, Karlsruhe (DE)

(72) Inventors: Burhanettin Koc, Ettlingen (DE); Thomas Polzer, Graben-Neudorf (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 167 days.

(21) Appl. No.: 16/627,021

(22) PCT Filed: Jun. 22, 2018

(86) PCT No.: PCT/DE2018/100582
§ 371 (c)(1),
(2) Date: Dec. 27, 2019

(87) PCT Pub. No.: WO2019/001632
PCT Pub. Date: Jan. 3, 2019

(65) Prior Publication Data
US 2020/0228031 A1      Jul. 16, 2020

(30) Foreign Application Priority Data

Jun. 30, 2017   (DE) ................... 10 2017 114 667.9

(51) Int. Cl.
*H02N 2/00*   (2006.01)
*H02N 2/10*   (2006.01)
*H02N 2/12*   (2006.01)

(52) U.S. Cl.
CPC ............. *H02N 2/0045* (2013.01); *H02N 2/10* (2013.01); *H02N 2/0055* (2013.01); *H02N 2/103* (2013.01); *H02N 2/12* (2013.01)

(58) Field of Classification Search
CPC .......... H02N 2/0045; H02N 2/10; H02N 2/12; H02N 2/0055; H02N 2/103
See application file for complete search history.

(56) References Cited

U.S. PATENT DOCUMENTS

| 6,798,118 B1 | 9/2004 | Wen |
| 2006/0145572 A1 | 7/2006 | Vyshnevskyy et al. |

(Continued)

FOREIGN PATENT DOCUMENTS

| CN | 105305872 A | 2/2016 |
| DE | 10314810 A1 | 8/2004 |

(Continued)

OTHER PUBLICATIONS

International Search Report (PCT/ISA/210) dated Sep. 20, 2018, by the European Patent Office as the International Searching Authority for International Application No. PCT/DE2018/100582. (previously submitted Dec. 27, 2019).

(Continued)

*Primary Examiner* — Emily P Pham
(74) *Attorney, Agent, or Firm* — Buchanan Ingersoll & Rooney PC

(57) ABSTRACT

A rotary ultrasonic motor includes an ultrasonic actuator, a driven element, an inner casing member and an outer casing member. A piezoelectric or electrostrictive or magnetostrictive material is arranged between an excitation electrode and at least one general electrode. The ultrasonic actuator is between the inner and outer casing members of a casing, and is directly or indirectly in contact with the element to be driven, so that periodic deformations generated in the ultrasonic actuator by electrical excitation are transferable to the drive element. The ultrasonic actuator is mounted by a retaining device arranged on the casing with at least one retaining section which engages in a recess associated with a respective retaining section.

20 Claims, 3 Drawing Sheets

(56) References Cited

U.S. PATENT DOCUMENTS

Figure 1:
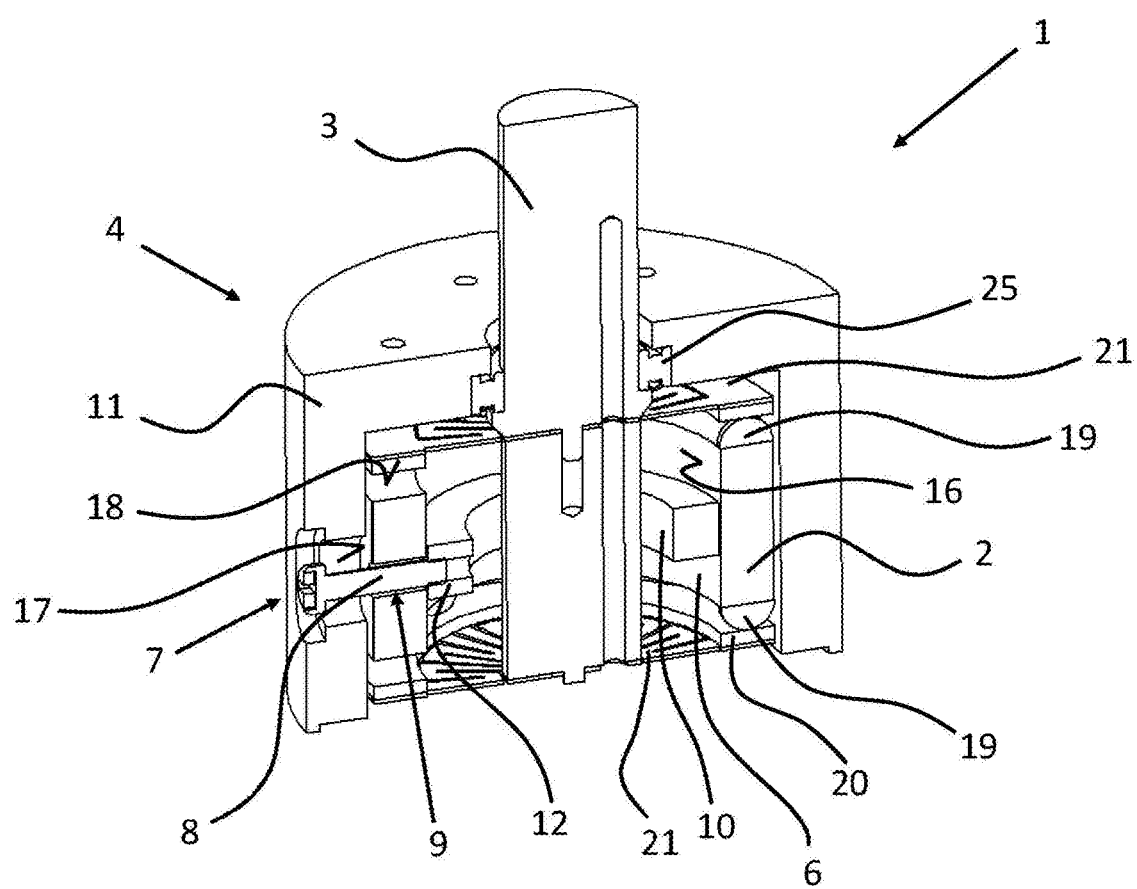

| | | | |
|---|---|---|---|
| 2010/0084946 A1* | 4/2010 | Park | H02N 2/08 |
| | | | 310/323.03 |
| 2015/0229240 A1 | 8/2015 | Wischnewskiy et al. | |
| 2018/0115259 A1 | 4/2018 | Marth et al. | |

FOREIGN PATENT DOCUMENTS

| | | |
|---|---|---|
| DE | 10329863 A1 | 2/2005 |
| DE | 102015005512 A1 | 10/2016 |
| EP | 2590315 A1 | 5/2013 |
| EP | 2680334 A1 | 1/2014 |

OTHER PUBLICATIONS

Written Opinion (PCT/ISA/237) dated Sep. 20, 2018, by the European Patent Office as the International Searching Authority for International Application No. PCT/DE2018/100582. (previously submitted Dec. 27, 2019).

Office Action (Notice of Reasons for Refusal) dated Feb. 9, 2021, by the Japanese Patent Office in corresponding Japanese Patent Application No. 2019-571998, and an English Translation of the Office Action. (8 pages).

C. Li et al., "Design of an Ultrasonic Motor with Multi-Vibrators", Journal of Zhejiang University-Science A (Applied Physics & Engineering), Sep. 1, 2016, pp. 724-732, vol. 17, No. 9.

K. Yokoyama, "Single-Phase Drive Ultrasonic Linear Motor Using a Linked Twin Square Plate Vibrator", Japanese Journal of Applied Physics, Jun. 20, 2013, vol. 52. (9 pages).

O. Vyshnevskyy et al., "New Type of Standing Wave Ultrasonic Rotary Piezo Motors with Cylindrical Actuators", PI (Physik Instrumente), Jun. 14, 2004. (5 pages).

Office Action (Notice of Preliminary Rejection) dated Jul. 20, 2021, by the Korean Patent Office in corresponding Korean Patent Application No. 10-2020-7002556, and an English Translation of the Office Action. (9 pages).

\* cited by examiner

ROTARY MOTOR WITH ULTRASONIC ACTUATOR

The invention relates to a rotary ultrasonic motor according to claims 1 to 15.

Known from DE 103 14 810 A1 is a rotary ultrasonic motor in which the stator is present in the form of a hollow cylindrical oscillator, where the hollow cylinder according to the method of the invention is put into a coupled tangential-axial vibration mode, so that the hollow cylinder performs periodic deformations. The vibration velocity maxima of the respective tangential component form at the face sides of the hollow cylinder, and the vibration velocity maxima of the axial component are only slightly spaced from those of the tangential component. Extending at the center of the cylinder height is a node line substantially parallel to the face sides, on which the axial vibration component has a value of zero and on which the tangential component has a minimum. Therefore, it is advantageous to retain or mount the stator in the region of said node line, since the formation of the periodic deformations of the stator is then faced only with a minimal resistance. A respective bearing is realized by way a retainer arranged at the outer circumferential surface of the stator in the form of a ring, where the ring with its outer circumferential surface contacts the stator at its inner circumferential surface substantially along the node line. The ring comprises several through holes distributed over its circumference, by way of which the ring can be attached to a casing, so that also the stator is attachable relative to the casing.

However, the arrangement of the retainer on the stator described in DE 103 14 810 A1 is relatively complex and is usually realized by way of an adhesive connection. For this, however, it is necessary that the geometry of the inner circumference of the retainer exhibit only very small deviations from the geometry of the outer circumference of the stator, so that a reliable and long-lasting adhesive connection arises. The attachment of the retainer to the outer circumference of the actuator is also space-consuming, so that a compact and space-saving rotary ultrasonic motor is difficult to obtain.

Adhesive compounds also have the disadvantage that they cannot usually be used in high vacuum applications due to the adhesive gassing out.

Therefore, it is the object of the invention to provide a compact rotary ultrasonic motor with an extended range of application in which retaining the stator or the ultrasonic actuator reliably and durably is accomplished in a simple manner, where the retainer provides the periodic deformations of the ultrasonic actuator with only an extremely low or negligible resistance.

This object is satisfied with a rotary ultrasonic motor according to claim 1, where the subsequent dependent claims describe at least advantageous further developments.

The term "substantially", appearing in the following part of the description in various passages in the context of the specification of geometric data such as angles, dimensions, positions, orientations or directions, shall be understood as meaning that the respective geometric data can have a deviation of +/−5% relative to the geometric date respectively specified, where this deviation is due, for example, to manufacturing or assembly tolerances.

The rotary ultrasonic motor according to the invention comprises at least one ultrasonic actuator which is preferably made of a piezoelectric material, where, however, also electrostrictive or magnetostrictive materials are conceivable. Arranged at the ultrasonic actuator are at least one excitation electrode and at least one general electrode, where the piezoelectric material is arranged between the at least one excitation electrode and the at least one general electrode. By applying a suitable electrical voltage to the electrodes, the ultrasonic actuator can be excited to form periodic deformations, where said periodic deformations by direct or indirect contact with an element to be driven can be transferred to the latter, thus realizing a motion of the element to be driven.

The rotary ultrasonic motor further comprises a casing with an inner casing member and an outer casing member, where at least one ultrasonic actuator is arranged or mounted between the inner casing member and the outer casing member. Retaining or mounting the ultrasonic actuator is realized by way of a retaining device that is arranged on the casing and comprises at least one retaining section, where at least one retaining section engages in a recess that is associated with the latter and disposed in the ultrasonic actuator.

It can be advantageous to have the retaining device be formed by a screw, where the recess comprises a thread interacting with the thread of the screw.

Furthermore, it can be advantageous to have the inner casing member and/or the outer casing member comprise a threaded portion and the recess be formed as a through hole, and the retaining device be formed as a screw and protrude through the through hole, where the thread of the screw interacts with the threaded portion of the inner casing member and/or the outer casing member.

In addition, it can be advantageous to have the inner casing member and the outer casing member be formed integrally with each other.

In addition, it can be advantageous to have the inner casing member and the outer casing member be connected to each other by web-shaped spring elements, where the ultrasonic actuator can be clamped between the web-shaped elements, preferably between damping elements arranged between the spring elements and the ultrasonic actuator.

Furthermore, it can be advantageous to have the at least one retaining section of the retaining device be formed integrally with the outer casing member and/or with the inner casing member.

In addition, it can be advantageous to have a clamping element be arranged between the inner casing member and the outer casing member and be connected to the inner casing member or the outer casing member such that displacement of the clamping element at least in sections, relative to the inner casing member and/or the outer casing member is possible, where pressing the retaining section against the recess is feasible with the displacement.

In addition, it can be advantageous to have the clamping element comprise at least one engagement section which is in engagement with an associated recess.

Likewise, it can be advantageous to have the at least one ultrasonic actuator have a hollow cylindrical shape or a plate shape with two main surfaces that are largest in terms of area and side surfaces or face surfaces that are smaller in terms of area and connect the main surfaces to each other, where the at least one recess points from one main surface to the other main surface and preferably extends as a through hole from one main surface to the other main surface.

In addition, it can be advantageous to have at least two excitation electrodes on one of the main surfaces of the ultrasonic actuator be respectively arranged spaced from each other due to a separation region disposed between them, and a recess, preferably embodied as a through hole, intersecting the respective separation region be arranged between respectively adjacent excitation electrodes.

Furthermore, it can be advantageous to have at least one friction element be arranged on at least one of the two face surfaces of the ultrasonic actuator connecting the main surfaces for direct or indirect contact with the element to be driven.

It can also be advantageous to have the at least one friction element be in contact with a friction ring, where the friction ring is arranged on a spring disk that is connected to the element to be driven and that presses the friction ring against the friction element.

In addition, it can be advantageous to have the ultrasonic actuator have a hollow cylindrical shape and at least one general electrode be arranged on one of the main surfaces, that defines a first circumferential surface, and at least six substantially equally sized excitation electrodes arranged on the other main surface, that defines a second circumferential surface, evenly distributed over the circumference with a separation region disposed between respectively adjacent excitation electrodes, where the ultrasonic actuator comprises three recesses distributed evenly over the circumference and embodied as through holes and at least three friction elements are respectively arranged on at least one face surface of the ultrasonic actuator distributed evenly over the circumference and positioned adjacent to a respective separation region, where the positions of the through holes and the friction elements along the circumference differ from each other.

It can be advantageous to have the rotary ultrasonic motor comprise three substantially rectangular ultrasonic actuators, where respectively adjacent ultrasonic actuators define an angle of substantially 60° between them, where at least one general electrode is respectively arranged on one of the main surfaces and at least two substantially equally sized excitation electrodes are arranged on the other main surface, where each of the rectangular ultrasonic actuators comprises two recesses each arranged in the region of the excitation electrodes and embodied as through holes, and a respective friction element is arranged on each of the longer side surfaces of the ultrasonic actuator adjacent to a respective separation region.

It can also be advantageous to have a bearing element arranged within the inner casing member and/or within the outer casing member for rotatably mounting the element to be driven.

Embodiments of the invention shall be described below with reference to the appended figures, where FIG. 1: shows an embodiment of a rotary ultrasonic motor according to the invention with a hollow cylindrical ultrasonic actuator FIG. 2: shows an ultrasonic actuator of the rotary ultrasonic motor according to FIG. 1

Figure 3:
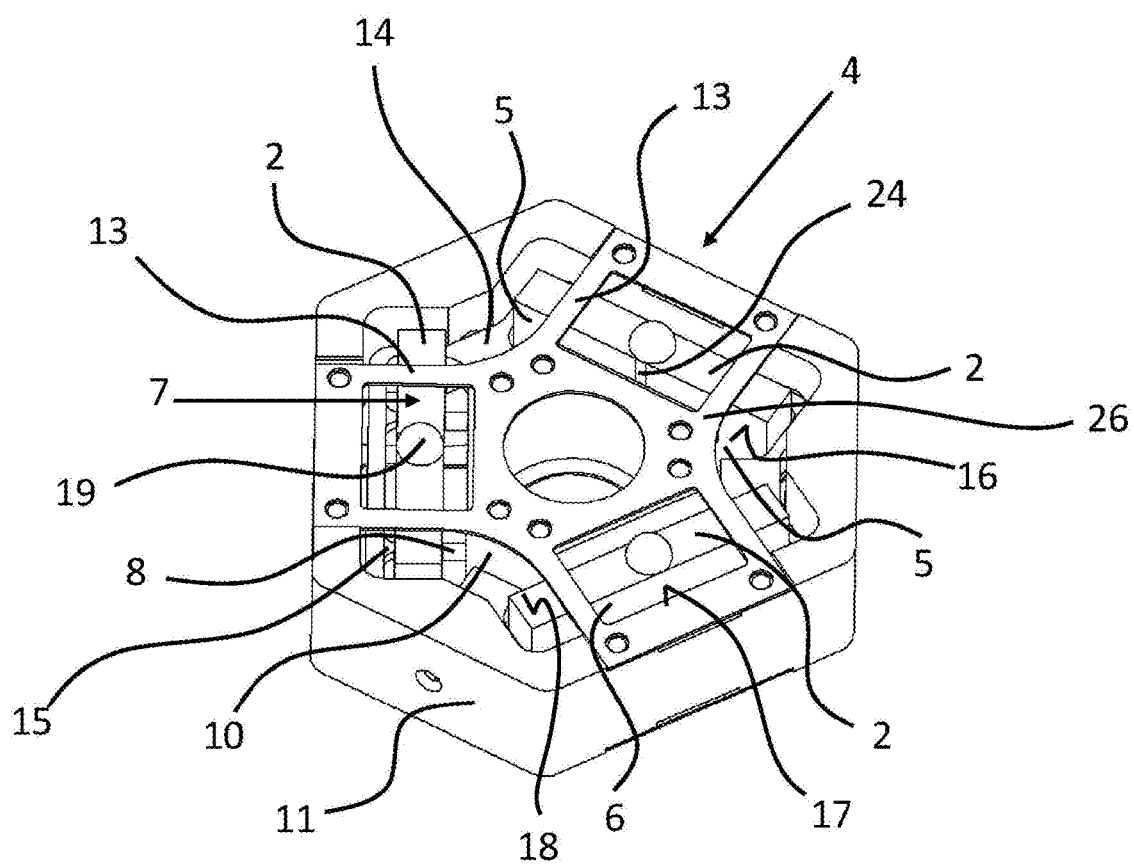

FIG. 3: shows a further embodiment of a rotary ultrasonic motor according to the invention with three rectangular ultrasonic actuators without an element to be driven FIG. 1 shows an embodiment of a rotary ultrasonic motor 1 according to the invention. It comprises an ultrasonic actuator 2 in the form of a hollow cylinder made of piezoelectric material or from piezoceramic material, respectively. A general electrode is arranged on the entire inner circumferential surface of the ultrasonic actuator, which defines a main surface 16 of the ultrasonic actuator, whereas several excitation electrodes each spaced from each other, not recognizable in FIG. 1, are arranged on the outer circumferential surface, which defines a further main surface 17. The piezoelectric or piezoceramic material is therefore arranged as a layer between the excitation electrodes and general electrode 6. By applying a suitable electrical voltage to the electrodes, an electric field is generated in the piezoelectric or piezoceramic material which leads to a deformation of the ultrasonic actuator due to the inverse piezoelectric effect. Selective periodic deformations of the ultrasonic actuator are achievable by respective periodic stresses, which lead to an effective drive motion of the rotary ultrasonic motor.

It is conceivable that the ultrasonic actuator comprises more than one layer of the piezoelectric material, where respective electrodes are arranged between adjacent layers (so-called multilayer actuator). It is then possible that the layers of the piezoelectric material and the electrodes are stacked in a radial direction or in an axial direction of the hollow cylinder.

Arranged on the two face sides 18 of the hollow cylinder distributed over the circumference are three respective friction elements 19 in the form of hemispheres, of which only one of the friction elements can be seen in FIG. 1. A friction ring 20 is in contact with the three respective friction elements 19 arranged on one of the two face surfaces, where each of the two friction rings 20 is pressed by way of a spring disk 21 against friction elements 19, so that an effective transmission of the motion of friction elements 19 to spring disks 21 due to the periodic deformations of ultrasonic actuator 2 can be realized. Since spring disks 21 in turn are firmly connected to element 3 to be driven in the form of a shaft, a rotary drive of element 3 to be driven is accomplished by driving spring disks 21. Element 3 to be driven is there mounted by way of a bearing element 25 in casing 4 in a rotatory movable manner.

Hollow cylindrical ultrasonic actuator 2 is arranged in a corresponding casing 4, where casing 4 comprises an inner casing member 10 in the form of a ring and an outer casing member 11 similar in shape, and the ultrasonic actuator is arranged between inner casing member 10 and outer casing member 11. A retaining device 7 comprises a retaining section 8 in the form of a screw or a screw shank, respectively, and a recess 9 in the ultrasonic actuator in the form of a through hole. While the head of the screw bears against outer casing member 11, the screw shank protrudes through recess 9 of the ultrasonic actuator, where the diameter of the screw shank corresponds substantially to the diameter of the recess of the ultrasonic actuator. At least the distal portion of the screw shank disposed opposite to the screw head comprises a thread which engages in complementary threaded portion 12 respectively provided in the inner casing member or interacts therewith. An attachment or mounting of the ultrasonic actuator that resists periodic deformations at most negligibly is accomplished due to the fact that recess 9 is arranged at such a location of the ultrasonic actuator at which only minor or negligible motions or deformations take place during operation.

Figure 2:
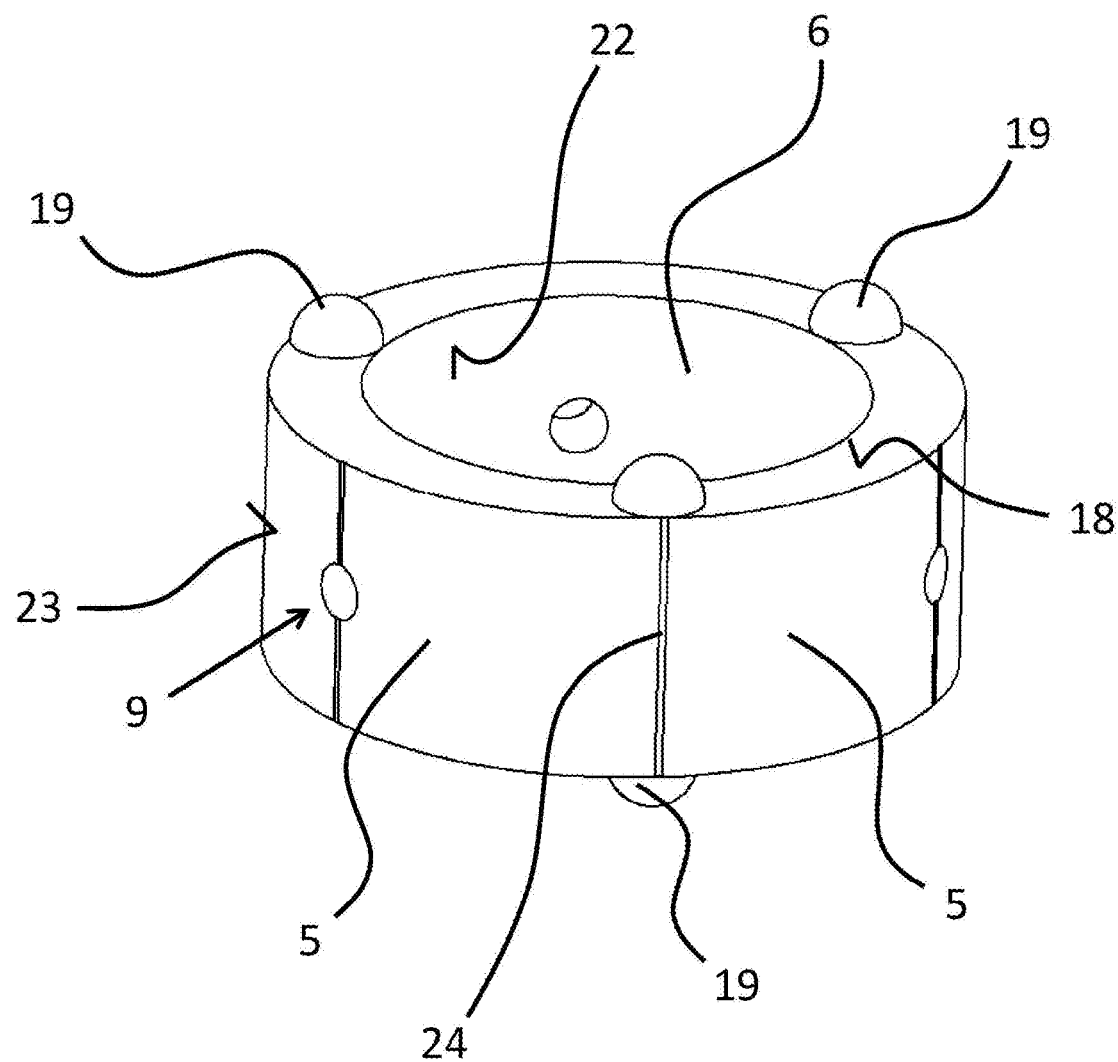

FIG. 2 shows a detail of an ultrasonic actuator of the rotary ultrasonic motor according to FIG. 1. The three friction elements 19 in the form of hemispheres, arranged on face surface 18 in FIG. 2 at the top, of the ultrasonic actuator which is formed as a hollow cylinder are there now clearly visible. In addition to the hemispherical shape, various other geometries are of course conceivable for the friction element.

Entire inner circumferential region 22 is covered with a general electrode 6 arranged thereon, whereas a total of six identically formed excitation electrodes are arranged on outer circumferential surface 23 evenly distributed over the circumference, where a separation region 24 is present between each adjacent excitation electrode 5 and separates the respective adjacent excitation electrodes 5 from each other, and they are electrically insulated against each other.

The ultrasonic actuator comprises three recesses 9 in the form of through holes that are distributed equidistantly over the circumference of the hollow cylinder and that each intersect a separation region 24. However, it is also conceivable that recesses 9 are provided at a different location, for example, at the center of respective excitation electrode 5.

Also the three friction elements 19 of a face surface 18 are arranged equidistantly with respect to the circumference of the hollow cylinder, and each of the friction elements is arranged in the region of respective separation region 24. Friction elements 19 of the two face surfaces 18 are there attached in an oppositely disposed arrangement.

The positions of friction elements 19 with respect to the circumference of the hollow cylinder differ from the positions of recesses 9 with respect to the circumference of the hollow cylinder. Friction elements 19 are there arranged in the middle between two adjacent recesses 9. Since both adjacent friction elements 19, as well as adjacent recesses 9, are at a distance with respect to the circumferential angle of the hollow cylinder of substantially 120°, the distance between a friction element and an adjacent recess with respect to the circumferential angle is substantially 60°.

FIG. 3 shows a further embodiment of a rotary ultrasonic motor according to the invention in which the driving element is omitted for reasons of clarity. Unlike the embodiment according to FIG. 1, the rotary ultrasonic motor does not have a hollow cylindrical ultrasonic actuator, but instead three substantially rectangular ultrasonic actuators 2, where respective adjacent ultrasonic actuators define an angle of substantially 60° between them.

Each of rectangular ultrasonic actuators 2 at its main surface 16 comprises two identically shaped excitation electrodes 5 which are separated from each other by separation region 24. On oppositely disposed main surface 17, each of the three ultrasonic actuators comprises a general electrode which covers substantially entire main surface 17.

A friction element 19 is arranged on each of the two oppositely disposed face surfaces 18 of an ultrasonic actuator substantially at its center in the region of separation region 24, where only one of the two friction elements is visible in FIG. 3.

The three ultrasonic actuators 2 are arranged in casing 4 between inner casing member 10 and outer casing member 11, where inner casing member 10 is connected to outer casing member 11 by way of two oppositely arranged connecting elements 26 to each other. Connecting elements 26 comprise web portions that are formed as spring elements 13 and are elastically deformable, which are in contact with face surfaces 18 of the respective ultrasonic actuator, and the ultrasonic actuators are thus each clamped in between associated spring elements 13. Damping elements are preferably arranged between spring elements 13 and respective face surface 18.

Retaining sections 8 of the respective retaining device 7, formed as pegs and integrally with inner casing member 10, engage in associated recesses of the ultrasonic actuators, which, however, are not seen in FIG. 3. The recesses are there arranged in the region of excitation electrodes 5 that are arranged on main surface 16.

Casing 4 comprises a clamping element 14 which is arranged between inner casing member 10 and outer casing member 11, where clamping element 14 is connected to outer casing member 11 such that the displacement of clamping element 14 at least in sections is possible relative to inner casing member 10. Due to the fact that engagement sections 15 of clamping element 14 are in engagement with recesses 9 from the direction of main surface 17, the displacement of clamping element 14 causes the respective retaining section 8 to be pressed against respective recess 9, so that a largely play-free mounting of the ultrasonic actuators is possible.

LIST OF REFERENCE NUMERALS 1. rotary ultrasonic motor
2. ultrasonic actuator
3. element to be driven
4. casing
5. excitation electrode
6. general electrode
7. retaining device
8. retaining section
9. recess
10. inner casing member
11. outer casing member
12. threaded portion
13. spring element
14. clamping element
15. engagement section
16. main surface (of the ultrasonic actuator)
17. main surface (of the ultrasonic actuator)
18. face surface (of the ultrasonic actuator)
19. friction element
20. friction ring
21. spring disk
22. first circumferential surface
23. second circumferential surface
24. separation region
25. bearing element
26. connecting element

The invention claimed is:

1. A rotary ultrasonic motor comprising:
at least one ultrasonic actuator;
an element to be driven and a casing having an inner casing member and an outer casing member;
wherein said at least one ultrasonic actuator includes at least one of piezoelectric, electrostrictive and magnetostrictive material arranged between at least one excitation electrode and at least one general electrode;
wherein said at least one ultrasonic actuator is arranged in said casing between said inner casing member and said outer casing member and is directly or indirectly in contact with said element to be driven, so that periodic deformations generated in said at least one ultrasonic actuator by electrical excitation, will be transferable to drive said element to be driven; and
wherein said at least one ultrasonic actuator is mounted by a retaining device arranged on said casing with at least one retaining section configured to engage in a recess associated with a respective retaining section and disposed in said at least one ultrasonic actuator.

2. The rotary ultrasonic motor according to claim 1, wherein said retaining device is formed by a screw, and said recess includes a thread configured for interacting with a thread of said screw.

3. The rotary ultrasonic motor according to claim 1, wherein at least one of said inner casing member and said outer casing member comprise:

a threaded portion, and said recess is formed as a through hole, and said retaining device is formed as a screw and protrudes through said through hole, where a thread of said screw interacts with said threaded portion of at least one of said inner casing member and said outer casing member.

4. The rotary ultrasonic motor according to claim 1, wherein at least one of said inner casing member and said outer casing member is embodied integrally formed with each other.

5. The rotary ultrasonic motor according to claim 1, wherein said inner casing member and said outer casing member are connected to each other by way of web-shaped spring elements, where said at least one ultrasonic actuator is configured to be clamped between said web-shaped spring elements by damping elements arranged between said web-shaped spring elements and said at least one ultrasonic actuator.

6. The rotary ultrasonic motor according to claim 1, wherein said at least one retaining section of said retaining device is formed integrally with at least one of said outer casing member and said inner casing member.

7. The rotary ultrasonic motor according to claim 1, further comprising:
a bearing element configured for rotatably mounting said element to be driven, and arranged within at least one of said inner casing member and said outer casing member.

8. The rotary ultrasonic motor according to claim 1, further comprising:
a clamping element arranged between said inner casing member and said outer casing member, and connected to at least one of said inner casing member and said outer casing member to allow displacement of said clamping element, at least in sections, relative to at least one of said inner casing member and said outer casing member, and to allow pressing of said at least one retaining section against said recess to occur with the displacement.

9. The rotary ultrasonic motor according to claim 8, wherein said clamping element comprises:
at least one engagement section in engagement with an associated recess.

10. The rotary ultrasonic motor according to claim 9, wherein said at least one ultrasonic actuator has at least one of a hollow cylindrical shape and a plate shape with two main surfaces that are largest in terms of area, and where said recess points from one of said two main surfaces to the other of said two main surfaces and extends as a through hole from one of said two main surfaces to the other of said two main surfaces.

11. The rotary ultrasonic motor according to claim 10, further comprising:
at least two excitation electrodes on one of said two main surfaces of said at least one ultrasonic actuator respectively arranged spaced from each other due to a separation region disposed between them and
a recess embodied as a through hole, arranged between respectively adjacent excitation electrodes and intersecting the respective separation region.

12. The rotary ultrasonic motor according to claim 10, further comprising:
at least one friction element arranged on at least one of two face surfaces of said at least one ultrasonic actuator connecting said two main surfaces for direct or indirect contact with said element to be driven.

13. The rotary ultrasonic motor according to claim 12, wherein said at least one friction element is in contact with a friction ring, where said friction ring is arranged on a spring disk that is connected to said element to be driven and that presses said friction ring against said at least one friction element.

14. The rotary ultrasonic motor according to claim 10, wherein said at least one ultrasonic actuator has a hollow cylindrical shape, and said at least one general electrode is arranged on one of said two main surfaces, that defines a first circumferential surface, and at least six substantially equally sized excitation electrodes are arranged on the other of said two main surfaces, that defines a second circumferential surface, evenly distributed over a circumference with a separation region disposed between respectively adjacent excitation electrodes, and wherein said at least one ultrasonic actuator further comprises:
three recesses distributed evenly over the circumference and embodied as through holes and
at least three friction elements respectively arranged on at least one face surface of said at least one ultrasonic actuator distributed evenly over the circumference and positioned adjacent to a respective separation region, where positions of said through holes and said at least three friction elements along the circumference differ from each other.

15. The rotary ultrasonic motor according to claim 10, further comprising:
three substantially rectangular ultrasonic actuators, where respectively adjacent ultrasonic actuators define an angle of substantially 60° between them, where said at least one general electrode is respectively arranged on one of said two main surfaces and at least two substantially equally sized excitation electrodes are arranged on the other or said two main surfaces, where each of said three substantially rectangular ultrasonic actuators includes two recesses, each of said two recesses being arranged in a region of said at least two substantially equally sized excitation electrodes and embodied as through holes, and a respective friction element is arranged on one of a longer side surfaces of an ultrasonic actuator adjacent to a respective separation region.

16. The rotary ultrasonic motor according to claim 2, wherein at least one of said inner casing member and said outer casing member comprise:
a threaded portion, and said recess is formed as a through hole, and said retaining device is formed as a screw and protrudes through said through hole, where a thread of said screw interacts with said threaded portion of at least one of said inner casing member and said outer casing member.

17. The rotary ultrasonic motor to claim 16, wherein at least one of said inner casing member and said outer casing member is embodied integrally formed with each other.

18. The rotary ultrasonic motor according to claim 17, wherein said inner casing member and said outer casing member are connected to each other by way of web-shaped spring elements, where said at least one ultrasonic actuator is configured to be clamped between said web-shaped spring elements by damping elements arranged between said web-shaped spring elements and said at least one ultrasonic actuator.

19. The rotary ultrasonic motor according to claim 18, wherein said at least one retaining section of said retaining device is formed integrally with at least one of said outer casing member and said inner casing member.

20. The rotary ultrasonic motor according to claim 19, further comprising:

a bearing element configured for rotatably mounting said element to be driven, and arranged within at least one of said inner casing member and said outer casing member.

\* \* \* \* \*